United States Patent [19]

Mollenauer et al.

[11] Patent Number: 5,039,199
[45] Date of Patent: Aug. 13, 1991

[54] LIGHTWAVE TRANSMISSION SYSTEM HAVING REMOTELY PUMPED QUASI-DISTRIBUTED AMPLIFYING FIBERS

[75] Inventors: Linn F. Mollenauer, Colts Neck; Kenneth L. Walker, New Providence, both of N.J.

[73] Assignee: AT&T Bell Laboratories, Murray Hill, N.J.

[21] Appl. No.: 458,928

[22] Filed: Dec. 29, 1989

[51] Int. Cl.$^5$ .............................................. G02B 6/26
[52] U.S. Cl. .................................... 359/334; 359/341; 385/31; 385/142
[58] Field of Search ............... 350/96.15, 96.16, 96.29, 350/96.30

[56] References Cited

U.S. PATENT DOCUMENTS

| | | | |
|---|---|---|---|
| 4,616,898 | 10/1986 | Hicks, Jr. ...................... | 350/96.30 X |
| 4,699,452 | 10/1987 | Mollenauer ...................... | 350/96.16 |
| 4,787,927 | 11/1988 | Mears et al. ...................... | 65/312 |
| 4,889,404 | 12/1989 | Bhagavatula et al. ....... | 350/96.30 X |
| 4,963,832 | 10/1990 | Desurvire et al. ............ | 350/96.15 X |

OTHER PUBLICATIONS

Koester et al., Applied Optics, vol. 3, No. 10, Oct. 1964, "Amplification in a Fiber Laser", pp. 1182–1186.
Mollenauer et al., IEEE Journal of Quantum Elec., vol. QE-22, No. 1, Jan. 1986, "Soliton Propagation in Long Fibers with . . . ", pp. 157–173.
Poole et al., J. of Lightwave Tech., vol. LT-4, No. 7, Jul. 1986, "Fabrication and Characterization of Low--Loss . . . ", pp. 870–876.
Desurvire et al., Optics Letters, vol. 12, No. 11, Nov. 1987, "High–Gain Erbium–Doped Traveling–Wave . . . ", pp. 888–890.
K. Aida et al., 15th European Conf. on Optical Comm., Sep. 10–14, 1989.
Post–Deadline Papers, vol. 3, "1.8Gb/s 310 km Fiber Transmission Without Outdoor Repeater Equipment . . . ", pp. 29–31.

Primary Examiner—William L. Sikes
Assistant Examiner—Phan T. Heartney
Attorney, Agent, or Firm—Gergory C. Ranieri

[57] ABSTRACT

Near uniform optical amplification is achieved in a lightwave transmission system in which a plurality of short lengths of rare earth doped silica-based fibers and a corresponding plurality of long lengths of substantially undoped silica-based fibers are interleaved to form a fiber span having alternating sections of compensated (moderate gain) and uncompensated lightwave transmission media. Pumping of the amplifying fiber sections is performed remotely from either end of the fiber span. Bidirectional pumping, that is, pumping from each end of the fiber span, enhances the uniformity of the optical amplification for signals over the entire span. Amplifying fiber section lengths are variable in substantially inverse proportion to dopant concentration within the particular section.

16 Claims, 2 Drawing Sheets

LIGHTWAVE TRANSMISSION SYSTEM HAVING REMOTELY PUMPED QUASI-DISTRIBUTED AMPLIFYING FIBERS

CROSS-REFERENCE TO RELATED APPLICATION

This application is related to co-pending, commonly assigned U.S. patent application Ser. No. 418,000 filed Oct. 6, 1989.

TECHNICAL FIELD

This invention relates to lightwave communication systems and, more particularly, to systems which include optical amplifiers.

BACKGROUND OF THE INVENTION

Long distance lightwave communication systems require amplifiers for boosting optical signal levels sufficiently to compensate losses experienced along the fiber transmission medium. Two classes of amplifiers are known, namely, lumped amplifiers and distributed amplifiers.

Lumped or discrete amplifiers are found in both semiconductor realizations and rare earth doped fiber embodiments. Rare earth doped fiber amplifiers have received a relatively high level of publicity in recent years because of their simplicity, low cost, and connective compatibility with existing optical fibers. For an exemplary locally pumped, rare-earth doped, fiber amplifier, see *Electron. Lett.*, Vol. 23, No. 19, pp. 1026 et seq. (1987). In theory, these amplifiers linearly increase optical signal power of a supplied input signal via stimulated emission of fiber dopants such as $Er^{3+}$ subject to a locally supplied optical pump source. While lumped amplifiers possess many beneficial attributes, it cannot be overlooked that their use adds noise such as amplified stimulated emission noise which accumulates from one amplification section to the next in a large communication system. Additionally, it is often necessary to include optical isolators or similar devices at the amplifier output to prevent unwanted feedback effects.

In response to the noise and feedback problems, distributed amplification systems based on stimulated Raman scattering and stimulated Brillouin scattering have been proposed. Such systems avoid the use of isolators and thereby operate bidirectionally. They provide distributed amplification on a substantially uniform basis which is an especially important characteristic for soliton-based lightwave systems. It is understood by those persons skilled in the art that these amplifiers also add amplified stimulated emission noise over the entire distributed amplifier. However, the amount of amplified stimulated emission noise is far less than that added by high gain lumped amplifiers. For reasonable pump powers on bidirectionally pumped fiber spans, it is expected that fiber spans are limited to be on the order of 50 km because the pump power exhibits exponential decay according to the loss coefficient of the fiber. Unfortunately, such short spans increase the cost of the lightwave transmission system with respect to both installation and maintenance.

At the present time, most telecommunication system designers specify long optical fiber spans for distributed amplification sections or between amplifiers on the order of at least 100 km. To achieve transmission over such long spans with cascaded lumped amplifier stages, it is possible to increase the optical signal power launched into the fiber at the transmitter to overcome the intrinsic loss of the longer optical fiber. However, such an approach causes significant signal intensity variations in the transmission fiber which lead to serious problems with nonlinear effects in the fiber itself and, possibly, to problems with saturation of the signal amplifiers. Nonlinear effects arising from nonuniform signal levels (i.e., a low signal level preceding an amplification stage and a very high signal level after amplification) are particularly deleterious when solitons are employed for signal transport. This is so because soliton-soliton collisions, which would normally be considered harmless for uniform amplification systems in that the effects of the approaching portion of the collision are substantially undone by the effects of the later departing portion of the collision, would now experience a large difference in nonlinear effects across the lumped amplifier causing collision effects to accumulate rather than cancel.

In response partially to the nonuniformity of signal amplification levels and to remedy the soliton-soliton collision problem experienced in lumped amplifiers, a distributed amplification technique has been disclosed in which bidirectional lightwave transmission is restored and uniform amplification of lightwave signals over long spans of optical fiber is achieved over potentially long spans. The disclosure is made in commonly assigned and copending application Ser. No. 418,000 (L. F. Mollenauer Case 14). Distributed uniform amplification is achieved by using an amplifying optical fiber which includes a long length of optical fiber having a dilute rare-earth dopant concentration substantially in the fiber core region, and a corresponding pump signal source at one or both ends of the doped fiber having the appropriate wavelength and power to cause amplification of optical signals by both Raman effects and stimulated emission from the rare-earth dopants. Dilute concentrations are understood as the range of concentrations substantially satisfying the condition that the gain from the rare-earth dopant, when pumped to nearly complete population inversion, is substantially equal to the fiber loss. While distributed uniform amplification is realized in one embodiment having a homogeneous span of optical fiber, other embodiments are shown in which distributed amplification is achieved using a combination of substantially long lengths ($\geq 1$ km) of dilutely doped fibers together with long lengths of undoped fibers within the same span. Uniformly distributed amplification (gain) is achieved by a stimulated Raman effect in each undoped fiber and by stimulated emission in the doped fiber. One drawback to this approach for distributed amplification is the need to produce long lengths of a non-standard optical fiber product, namely, dilute rare earth doped silica fiber.

SUMMARY OF THE INVENTION

Nearly uniform optical amplification is achieved in a lightwave transmission system in which a plurality of short lengths of rare earth doped silica-based fibers and a corresponding plurality of long lengths of substantially undoped silica-based fibers are interleaved to form a fiber span having alternating sections of compensated and uncompensated lightwave transmission media. Pumping for the amplifying fiber sections is performed remotely from either end of the fiber span. Bidirectional pumping, that is, pumping from each end of the fiber span, enhances the uniformity of the optical amplification for signals over the entire span. Amplifying fiber section lengths are variable in substantially inverse proportion to dopant concentration within the particular section.

While nearly uniform amplification is achieved in a quasi-distributed rather than distributed system architecture, other benefits which accrue from use of the present invention are compatibility of fiber elements within a span, adaptability of standard fiber elements for use in each span, and reduced noise versus system architectures incorporating directly pumped, high gain, doped fiber amplifiers.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
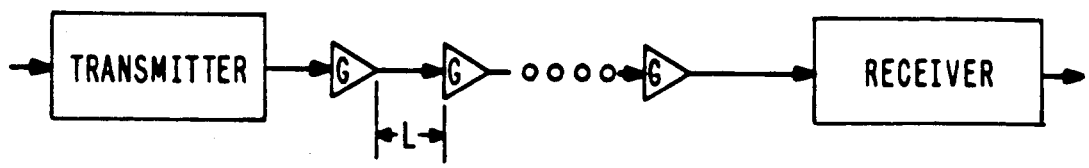
FIG. 1 shows a simplified block diagram of a prior art long distance, lightwave communication system employing lumped optical amplifiers after each span of optical fiber.

Actual and proposed long distance lightwave communication systems described in the literature strive for long unrepeatered spans of optical fiber by employing lumped amplifiers at the end of each fiber span. FIG. 1 shows a simplified block diagram of a prior art long distance, lightwave communication system employing lumped optical amplifiers after each span of optical fiber. Each lumped amplifier, G, linearly boosts the optical signal power supplied to the next span of fiber labeled L as shown in FIG. 1 in much the same manner as conventional electronic amplifiers for analog coaxial-cable systems. See *Optical Fiber Telecommunications* II, edited by S. E. Miller et al., pp. 819-22 (Academic Press: 1988). Optical isolators are generally employed with each amplifier to avoid feedback effects. Since isolators are unidirectional devices, the resulting lightwave system is also unidirectional.

For the lightwave amplification system shown in FIG. 1, each lumped amplifier includes either an electronically-pumped semiconductor amplifier or an optically pumped fiber amplifier. Semiconductor amplifiers utilize stimulated emission from injected carriers to provide gain whereas fiber amplifiers provide gain by stimulated Raman or Brillouin scattering or fiber dopants such as molecular $D_2$ or $Er^{3+}$. In the case of fiber amplifiers, each lumped amplifier G has an individual pump signal source coupled locally thereto. For an exemplary locally pumped, rare-earth doped, fiber amplifier, see Mears et al., *Electron. Lett.*, Vol. 23, No. 19, pp. 1026 et seq. (1987). While lumped amplifiers are simpler, less expensive alternatives to regenerative optoelectronic repeaters, it cannot be overlooked that their use adds noise such as amplified stimulated emission noise which accumulates from one amplification section to the next.

System designs for future long distance lightwave communication systems are presently specifying relatively long fiber spans of approximately 100 km. between system elements on the span such as repeaters or regenerators or pump lasers or the like. To achieve transmission over such long spans with cascaded lumped amplifier stages, it is possible to increase the optical signal power launched into the fiber at the transmitter to overcome the intrinsic loss of the longer fiber. However, such an approach causes significant signal intensity variations in the transmission fiber which lead to serious problems with nonlinear effects in the fiber itself and, possibly, to problems with saturation of the signal amplifiers.

By integrating short sections of at least moderate gain, doped fiber into long transmission fiber spans, the remotely pumped quasi-distributed amplifying fiber system provides an artificially lossless, quasi-distributed substitute for having high gain lumped amplifiers at one end of each long span. The remotely pumped quasi-distributed amplifying fiber system also operates with lower noise because the doped gain sections of each amplifying fiber generate less amplified stimulated emission noise than high gain lumped fiber amplifiers. Additionally, the remotely pumped quasi-distributed amplifying fiber system provides a more cost effective substitute for purely distributed amplification systems which employ long lengths of dilutely doped fiber as the distributed amplification or gain medium. While long spans are described in the context of the exemplary embodiments below, it should be understood by those skilled in the art that the present invention finds application in spans of all lengths, that is, shorter spans (1 km.$\leq L \leq$100 km.) and even longer spans ($L \geq$100 km.) than the suggested design choice.

Figure 2:
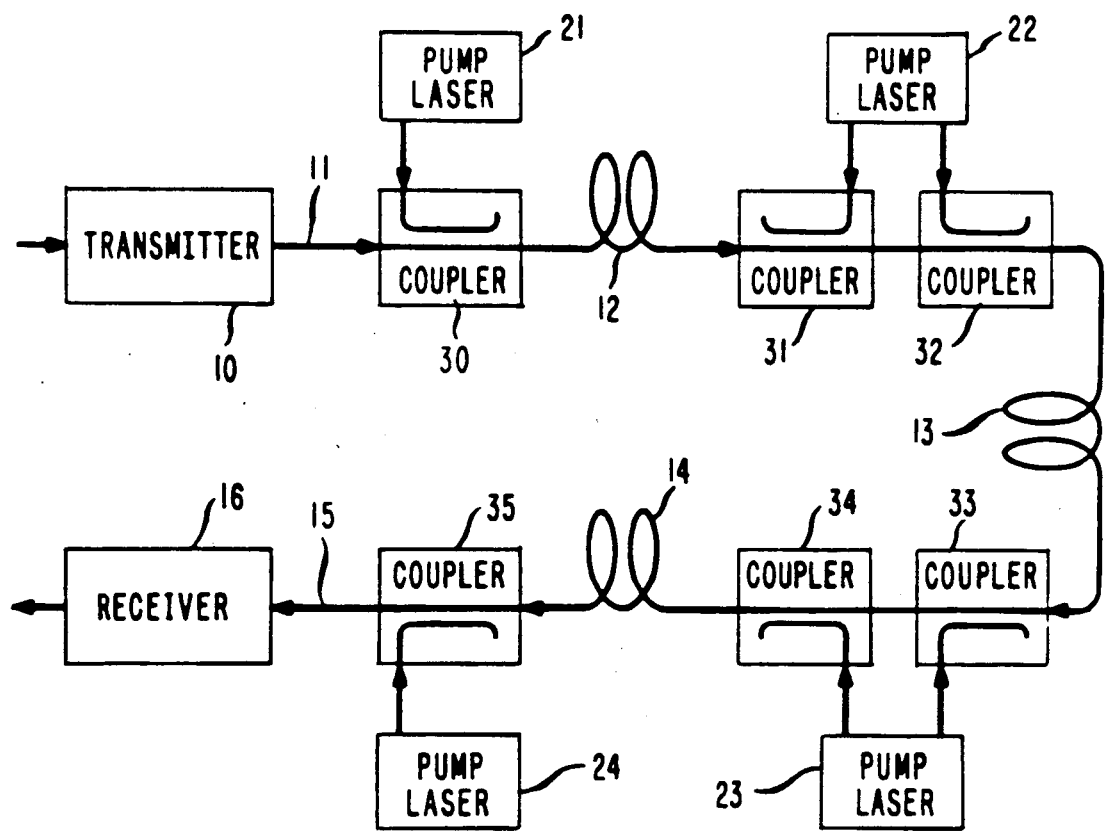
FIG. 2 shows an exemplary multiple span, long distance, lightwave communication system employing remotely pumped, quasi-distributed amplification in accordance with the principles of the invention.

An exemplary lightwave communication system is shown in FIG. 2 in which three quasi-distributed amplification spans substantially cover the long distance between transmitter 10 and receiver 16. While only three quasi-distributed amplification spans have been depicted in the FIG. 3, it is understood by those skilled in the art that the number of spans can assume any value between 1 and N, where N is a large integer on the order of 100 or more for 80 km spans in an exemplary transoceanic lightwave communication system. Transmitter 10 is shown coupled optically to the first span by transmission medium 11 which may be realized by optical fiber or a fiber and lens combination or an air gap or some suitable waveguide device for coupling lightwave signals known by those persons of ordinary skill in the art. In a similar manner, receiver 16 is shown coupled optically to the third span by transmission medium 15 which may be realized by some suitable waveguide device for coupling lightwave signals known by those persons of ordinary skill in the art. Each span shown in FIG. 2 comprises pump lasers optically coupled through an appropriate coupling element to each end of a span of quasi-distributed optical amplifying fiber for pumping the entire span and, thereby, achieving gain sufficient to counteract at a minimum the intrinsic loss of the fiber.

The first span comprises a span of quasi-distributed amplifying fiber 12 to which both pump laser 21 is optically coupled through coupler 30 for remote pumping of the span which is co-directional with respect to the transmitted lightwave signal and pump laser 22 is optically coupled through coupler 31 for remote pumping of the span which is contra-directional with respect to the transmitted lightwave signal. The second span comprises a span of quasi-distributed amplifying fiber 13 to which both pump laser 22 is optically coupled through coupler 32 for remote pumping of the span which is co-directional with respect to transmitted lightwave signal and pump laser 23 is optically coupled through coupler 33 for remote pumping of the span which is contra-directional with respect to the transmitted lightwave signal. The third span comprises a span of quasi-distributed amplifying fiber 14 to which both pump laser 23 is optically coupled through coupler 34 for remote pumping of the span which is co-directional with respect to transmitted lightwave signal and pump laser 24 is optically coupled through coupler 35 for remote pumping of the span which is contra-directional with respect to the transmitted lightwave signal.

In this embodiment, a single pump laser such as laser 22, which is located at the connection of two spans, provides co-directional remote pumping for one span and contra-directional remote pumping for the other span in a manner similar to that shown in U.S. Pat. No. 4,699,452 (FIG. 5). It is contemplated that first and second pump lasers may be employed in place of laser 22 for providing remote pumping to one span in a contra-directional manner (the first pump laser) and on the other span in a co-directional manner (the second pump laser). The latter combined pumping arrangement is shown in U.S. Pat. No. 4,699,452 (FIG. 6) and in an article by L. F. Mollenauer et al., *IEEE Journal of Quantum Electronics*, Vol. QE-22, No. 1, page 157, (1986).

Remote pump lasers 21, 22, 23, and 24 are selected to operate in a continuous wave (CW) or quasi-continuous wave (quasi-CW) mode at a wavelength for achieving amplification at the wavelength of the transmitted lightwave signal in the sequence of spans of the quasi-distributed amplifying fiber. Moreover, since pumping is performed remotely, it is necessary that the fiber span support transmission at the pump wavelength. Amplifying fibers doped with erbium ($Er^{3+}$), for example, require a pump signal in the wavelength range 1.46 $\mu$m to 1.48 $\mu$m to cause amplification of a transmitted lightwave signal in the wavelength range 1.53 $\mu$m to 1.58 $\mu$m. As such, standard fused silica fibers operating nominally at 1.5 $\mu$m are capable of supporting propagation of both the remote pump and transmitted lightwave signals.

It should be noted that additional amplification in the amplifying fiber via the Raman effect is also possible when the wavelength separation between the pump signal and transmitted lightwave signal is judiciously selected. For fused silica fibers, significant Raman amplification is achieved over a relatively broad band of frequencies approximately 300-450 $cm^{-1}$ below the pump frequency when sufficient pump power ($\sim$30 mW to 100 mW) is applied. The amount of Raman gain achieved is directly proportional to the amount of pump power supplied to the fiber. See, for example, the above-cited article by Mollenauer et al. at page 165 (FIG. 13). As will be described below, modest pump laser power such as that available from semiconductor lasers is sufficient to achieve both Raman gain and gain via stimulation of the fiber dopant ions.

Couplers 30, 31, 32, 33, 34, and 35 are shown as standard directional couplers well known to those skilled in the art. In a preferred embodiment, wavelength dependent directional couplers are employed to provide cross-coupling of the pump signal while simultaneously providing straight-through coupling of the amplified transmitted lightwave signal. Both types of couplers provide a means for coupling the optical power from each corresponding pump laser source to the waveguide and fiber over which the transmitted lightwave signal is propagating while simultaneously allowing the transmitted lightwave signals to proceed substantially unimpeded from fiber 11 to fiber 12, from fiber 12 to fiber 13, and so on. These couplers are realizable in fiber, semiconductor and other dielectric waveguide (e.g., lithium niobate) devices. Also, optical elements such as dichroic mirrors may be utilized for optical coupling.

Quasi-distributed amplifying fibers 12, 13, and 14 provide the medium for quasi-distributed, substantially uniform amplification of the transmitted lightwave signal via gain from stimulation of the dopant ions in short doped fiber sections of each fiber and, possibly, via gain from the Raman effect in the entire amplifying fiber. The quasi-distributed amplifying fibers can be made to any length. Rare earth dopants such as erbium, holmium, neodymium and the like are contemplated for incorporation primarily in the core region of the fiber. By locating the dopant ions centrally in the core region of the fiber, it is possible to achieve a maximum level of saturation for a given pump power because interaction between the dopant ions and the optical fields for the lightwave signals is substantially optimized. Fused silica fibers are preferred because their transmission characteristics are well suited to lightwave signal propagation around 1.5 $\mu$m. In order to achieve improved transmission performance over the system, it may be desirable to utilize dispersion shifted fibers or single polarization fibers (e.g., polarization maintaining fibers or polarization preserving fibers) as the foundation for the quasi-distributed amplifying fiber. Compatibility between undoped and doped fibers in an amplifying span should be considered when fabricating the quasi-distributed amplifying fiber to reduce possible sources of loss. Fabrication techniques for making doped fibers are known to those skilled in the art and are discussed in U.S. Pat. No. 4,787,927 whose teachings are expressly incorporated herein by reference.

Rare earth dopants in fibers such as silica-based optical fibers are easily pumped to saturation. By saturation, it is meant that most of the dopant ions are in an optically excited state. Gain derived from the saturated rare earth dopant ions is significantly less dependent on the applied pump power than in a system using pure Raman gain. By assuming that approximately 90% of the dopant ion population is inverted, that is, pumping to achieve approximately 90% saturation, it is possible to estimate length and concentration for a desired amount of gain in a doped section as follows:

$$n_0 \cdot L \approx 6.3 \times 10^{17} \cdot G,$$

where $n_0$ is the dopant ion concentration in the fiber core expressed in $cm^{-3}$, L is the doped fiber section length expressed in meters, and G is the desired amount of gain to be derived from the short doped fiber section expressed in dB. As the amount of saturation varies, the constant multiplier is subject to change according to relationships well known to persons skilled in the art. Using the expression given above, it is seen that, for a gain of 2.6 dB and a fiber length of 50 m, it is desirable to provide the doped section with a dopant concentration of approximately $3.3 \times 10^{16}$ cm$^{-3}$. However, it is well known to those skilled in the art that longer lengths of less heavily doped fiber may be used as well as shorter lengths of more heavily doped fiber to achieve this exemplary gain. It is understood and will be described below that the overall gain of each short doped section is the important design factor in developing the quasi-distributed amplifying fiber. The gain of each short doped section is determined by its length, doping concentration and incident remote pump power for the section.

Figure 3:
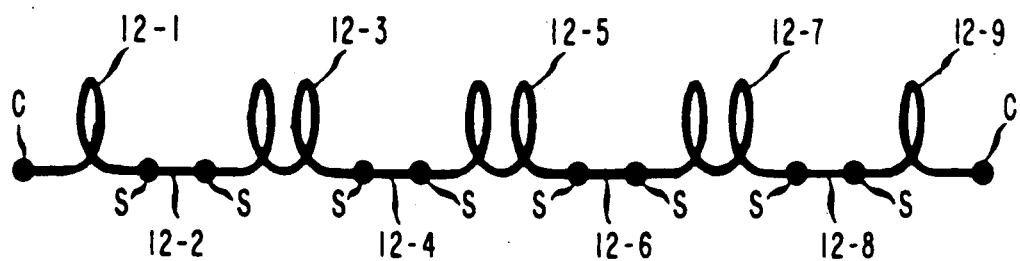
FIG. 3 shows an exemplary span of optical fiber from the system in FIG. 2 which exhibits quasi-distributed amplification in accordance with the principles of the invention.

In order to appreciate the benefits derived from the use of remotely pumped spans of quasi-distributed amplifying fiber, it is best to focus attention on the operation of an exemplary single bidirectionally remotely pumped span shown in FIG. 3. As shown in FIG. 3, the exemplary span of quasi-distributed amplifying fiber comprises substantially undoped fiber sections 12—1, 12—3, 12—5, 12—7, and 12—9, interleaved with doped fiber sections 12—2, 12—4, 12—6, and 12—8. Each doped fiber section is generally short in comparison to the undoped sections and has sufficiently high dopant concentration and length to provide a predetermined level of gain for an incident pump signal power. The predetermined level of gain is usually selected to compensate intrinsic loss in the undoped fiber sections plus splice and coupler losses. In general, the undoped sections of fiber span distances on the order of kilometers or tens of kilometers whereas each doped section covers a distance generally less than several hundred meters. From experimental practice, short doped sections are selected to have a length on the order of 40 m to 100 m with a doping concentration greater than approximately $10^{15}$ cm$^{-3}$ to provide a moderate amount of gain between approximately 1 dB and 6 dB.

For the span shown in FIG. 3, the quasi-distributed amplifying fiber 12 covers a distance of approximately 80 km. The component undoped fiber sections were selected to be 10 km (sections 12—1 and 12—9) and 20 km (sections 12—3, 12—5, 12—7, and 12—9). The doped fiber sections have the desired short length and substantially high doping concentration to provide predetermined amounts of gain as follows: 2.6 dB (sections 12—2 and 12—8) and 3.4 dB (sections 12—4 and 12—6). Standard splices labeled S in FIG. 3 are used to interconnect doped and undoped fiber sections. These splices include but are not limited to fusion splices, rotary splices and the like. Couplers labeled C are employed to interconnect spans of quasi-distributed amplifying fiber. These couplers are shown in FIG. 2 as couplers 30 and 31.

Figure 4:
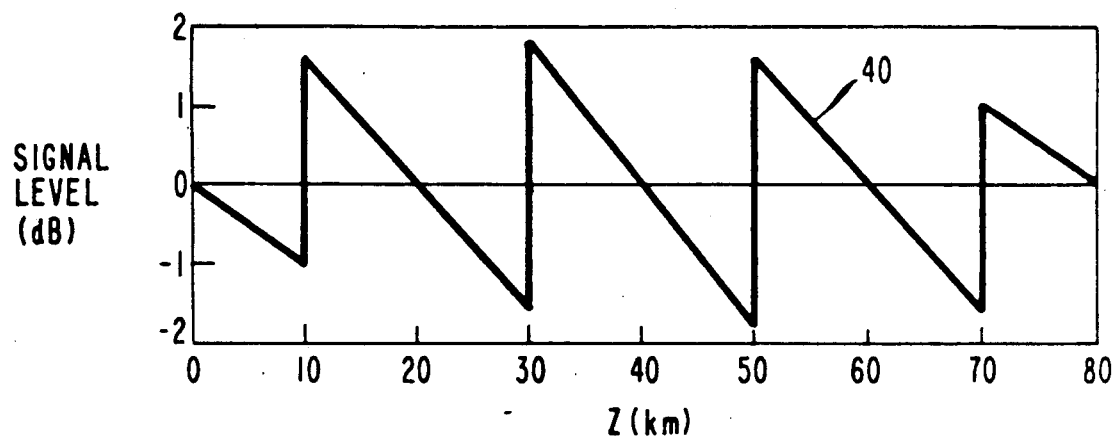
FIG. 4 shows a graph of signal level versus span distance for optical signals on the exemplary fiber span of FIG. 3.

By employing the quasi-distributed amplifying fiber in transmission spans, it is possible to provide sufficient amplification of lightwave signals to effectively compensate the intrinsic loss of the fiber over the entire span while maintaining the concomitant signal level fluctuations at a low level. FIG. 4 shows relative signal level versus distance along the exemplary span of FIG. 3. For the bidirectionally pumped span in FIG. 3, the remote pump signal power level is chosen to be approximately 50 mW injected from each end. As shown by curve 40, stimulated gain from the remotely pumped doped sections combines with Raman gain to compensate span losses. Instantaneous changes in the signal level shown by curve 40 at 10 km, 30 km, 50 km and 70 km result from the moderate gain provided by short doped fiber sections 12—2, 12—4, 12—6, and 12—8, respectively.

It should be understood by those persons skilled in the art that it is desirable to provide higher levels of moderate gain for the doped sections located closer to the center of a span than for those sections located nearer the ends of the span because the amount of Raman gain decreases exponentially with distance. In general, doped section gain may be designed between 1 and 6 dB for most quasi-distributed amplifying fiber applications.

It has been stated above that fiber compatibility is a consideration for span fabrication. That is, it may be desirable to fabricate doped and undoped sections from similar fiber types such as dispersion shifted fiber or polarization preserving fiber or the like. In the event that such compatibility is not achievable by selecting similar fiber types, it is possible to attain compatibility by mode matching techniques such as via the use of fiber tapers.

While fiber spans have been shown for approximately 80 km. from remote pump source to remote pump source, it is understood that this invention is applicable to longer distances with the appropriate combination of moderate gain for the short doped sections of the fiber span and pump power for the distance being spanned. It is contemplated that the total distance capable of being spanned by one quasi-distributed amplifying fiber can be greater than 100 km.

It has been contemplated, although not expressly shown in the FIGURES that doped fiber sections may be the initial and/or final sections of a span of quasi-distributed amplifying fiber.

We claim:

1. An optical system for amplifying a first lightwave signal at a first wavelength, said system comprising,
   an optical fiber having first and second ends, said optical fiber including n sections of substantially undoped optical fiber interleaved with at least n−1 sections of doped optical fiber, each of said n sections of undoped optical fiber having an intrinsic loss, said doped optical fiber sections each having a predetermined length less than 1 km and a concentration of rare-earth dopant ions greater than $10^{14}$ cm$^{-3}$ to provide moderate gain less than 10 dB, n is an integer greater than 2, the gain of said at least n−1 sections of doped optical fiber compensates substantially said intrinsic loss from said n sections of undoped optical fiber,
   a source of a first pump signal at a second wavelength for exciting the state of said dopant ions in each of said at least n−1 sections of doped optical fiber to cause stimulated emission therefrom, and
   means for optically coupling said first pump signal into the first end of said optical fiber.

2. An optical system as defined in claim 1 wherein said rare-earth dopant ions includes $Er^{3+}$.

3. The optical system defined in claim 1 wherein a difference between said first wavelength and said second wavelength is sufficient to cause Raman gain of the first lightwave signal in the optical fiber.

4. The optical system defined in claim 1 wherein doped optical fiber sections have decreasing gain from the center of said optical fiber toward each of said first and second ends.

5. An optical system as defined in claim 4 wherein said rare-earth dopant ions includes $Er^{3+}$.

6. The optical system defined in claim 1 further comprising a source of a second pump signal at said second wavelength for exciting the state of said dopant ions to cause stimulated emission therefrom, and means for optically coupling said second pump signal into the second end of said optical fiber.

7. An optical system as defined in claim 6 wherein said rare-earth dopant ions includes $Er^{3+}$.

8. The optical system defined in claim 6 wherein a difference between said first wavelength and said second wavelength is sufficient to cause Raman gain of the first lightwave signal in the optical fiber.

9. The optical system defined in claim 6 wherein doped optical fiber sections have decreasing gain from the center of said optical fiber toward each of said first and second ends.

10. An optical system as defined in claim 9 wherein said rare-earth dopant ions includes $Er^{3+}$.

11. An optical system for amplifying a first lightwave signal at a first wavelength, said system comprising,
an optical fiber having first and second ends, said optical fiber including first, second, and third sections connected in sequence wherein said first and third sections are substantially undoped, each of said first and third sections having an intrinsic loss, and said second section includes a concentration of rare-earth dopant ions greater than $10^{14}\,cm^{-3}$, said second section optical fiber having a length less than 1 km to provide moderate gain less than 10 dB, the gain of said second section compensates substantially said intrinsic loss from the first and third sections,
a source of a first pump signal at a second wavelength for exciting the state of said dopant ions in said second section to cause stimulated emission therefrom, and
means for optically coupling said first pump signal into the first end of said optical fiber.

12. An optical system as defined in claim 11 wherein said rare-earth dopant ions includes $Er^{3+}$.

13. The optical system defined in claim 12 wherein a difference between said first wavelength and said second wavelength is sufficient to cause Raman gain of the first lightwave signal in the optical fiber.

14. The optical system defined in claim 11 further comprising a source of a second pump signal at said second wavelength for exciting the state of said dopant ions to cause stimulated emission therefrom, and means for optically coupling said second pump signal into the second end of said optical fiber.

15. An optical system as defined in claim 14 wherein said rare-earth dopant ions includes $Er^{3+}$.

16. The optical system defined in claim 14 wherein a difference between said first wavelength and said second wavelength is sufficient to cause Raman gain of the first lightwave signal in the optical fiber.

* * * * *